No. 611,955. Patented Oct. 4, 1898.
LA GEE BRAINARD.
COOKING OR HEATING UTENSIL.
(Application filed July 22, 1897.)
(No Model.)
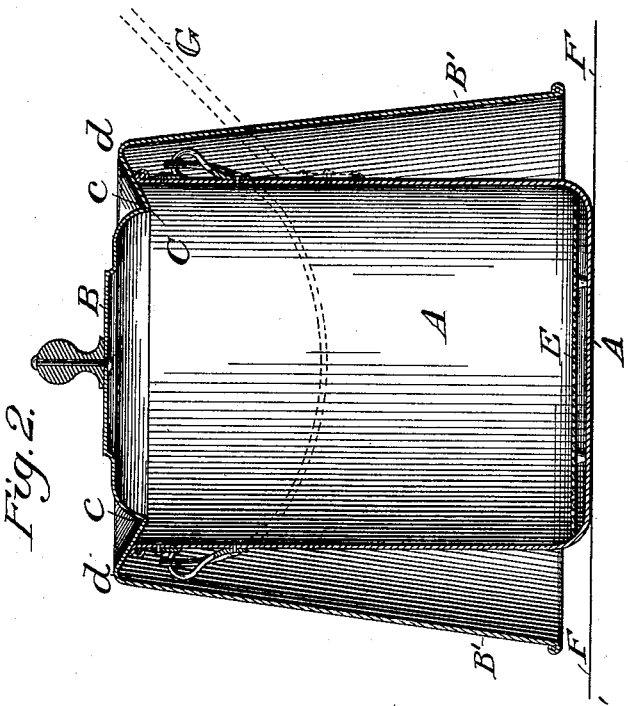
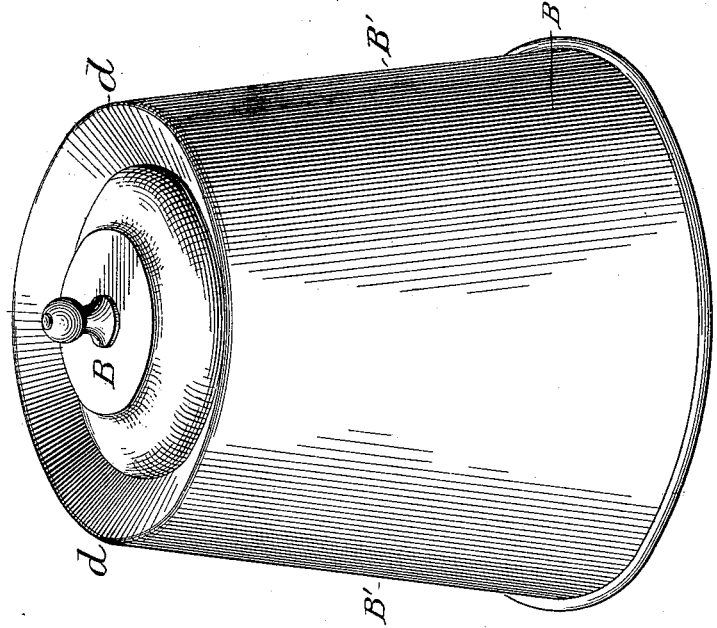
Witnesses:
Inventor:

UNITED STATES PATENT OFFICE.

LA GEE BRAINARD, OF VALKARIA, FLORIDA.

COOKING OR HEATING UTENSIL.

SPECIFICATION forming part of Letters Patent No. 611,955, dated October 4, 1898.

Application filed July 22, 1897. Serial No. 645,636. (No model.)

*To all whom it may concern:*

Be it known that I, LA GEE BRAINARD, a citizen of the United States, residing at Valkaria, county of Brevard, and State of Florida, have invented a new and useful Improvement in Cooking or Heating Utensils, of which the following is a specification.

My invention relates to the improvement in cooking or heating utensils in which an ordinary vessel is provided with a cover having a flange or shield extending from the top around and nearly to the bottom of the vessel. The cover is also provided with a drip-point, situated within the radius of the outer one-eighth of the cover, extending downward and into the vessel. The cover is further provided with an upwardly and outwardly inclining section which when the cover is in position forms a junction with the rim of the vessel and a guide to center the cover with reference to the vessel.

The object of my improvement is, by means of the flange or shield, to collect and retain the heat from the stove or other heating-surface against the entire sides of the vessel, thus utilizing a greater area of heating-surface than is represented by the bottom of the vessel or the base of the vertical flanges as heretofore made.

The object of the drip-point is to carry the water of condensation from the point back into the vessel, next to the walls thereof, thereby preventing the kettle from boiling dry and providing circulation of fluid and heat.

The upwardly and outwardly inclining section of the cover at $c\ d$ is designed to enable the cover to fit different-sized vessels; also, to form a joint with the rim of the vessel and by its inclination to guide the cover to a central position when placed on the vessel, and to further provide a conduit for the water of condensation from the rim of the vessel to the drip-point.

I attain these results by the mechanism illustrated in the accompanying drawings, in which—

Figure 1 is a perspective view of the cover and shield B B' B'. Fig. 2 is a vertical section of the entire cooking or heating utensil at its center.

A A A, Fig. 2, are the sides and bottom of an ordinary cooking utensil.

B is the cover, provided with the circular and conical shield or casing B' B', reaching nearly to the bottom of the vessel and preferably with the bottom of the casing of greater diameter than at the top. This casing collects and retains the heat against the entire sides of the vessel, compassing and utilizing a greater heating-surface than is represented by the bottom of the kettle or the base of perpendicular flanges of the same-sized cover as heretofore made—in fact, utilizing the heat arising from the surface directly under and corresponding to the greater diameter of the casing B' B'.

C C is the drip-point, formed in the cover by the angle at $c\ c$. This being the lowest point in the cover exposed to vapor, the condensation drips from this point back into the vessel, near its sides, thus retaining the flavor of the article cooking and preventing boiling dry, and also assisting in the proper circulation of the boiling fluid.

That section of the cover from the point C should incline outward and upward about forty-five degrees to $d$, so that the cover when placed on the vessel will find its central position and produce a joint between dish and cover. This inclined section of the cover renders it capable of fitting different-sized kettles, ranging in diameter nearly from $c$ to $d$. So, also, this incline conducts condensation from the rim of the vessel to the drip-point C.

The vessel A A A to be more suitable for the application of my invention should be provided with a bail attached to ears situate a little below the rim of the vessel, so as not to come in contact with the cover and casing. If, however, the kettle be provided with a handle, as in Fig. 2 at G, then an opening may be made in the casing sufficiently large so that it may be slipped down over the handle and to its proper position. The efficiency of this shield may be much increased by lining it with an asbestos jacket.

F F represent the top of the stove or other heating-surface.

I am aware that heretofore cooking utensils have been made similar to the vessel A A, and am now advised by reference that covers for cooking utensils and bake-ovens have been heretofore patented, but differing from that claimed by me, as hereinafter pointed out.

What I claim as my invention, and desire to secure by Letters Patent, is—

The combination with a cooking vessel, of a cover adapted to rest thereon, and provided with a drip-point C, located below and near the upper edge of the cover and a conical shield secured to the edge of the cover and extending to near the bottom of the vessel, substantially as described.

LA GEE BRAINARD.

Witnesses:
FRANK H. FEE,
E. P. BRANCH.